US011595286B2

(12) United States Patent
Ramamurthi et al.

(10) Patent No.: US 11,595,286 B2
(45) Date of Patent: Feb. 28, 2023

(54) SYSTEMS AND METHODS FOR MODIFYING PARAMETERS OF A WIRELESS NETWORK BASED ON GRANULAR ENERGY EFFICIENCY METRICS

(71) Applicant: Verizon Patent and Licensing Inc., Basking Ridge, NJ (US)

(72) Inventors: Vishwanath Ramamurthi, San Ramon, CA (US); Jin Yang, Orinda, CA (US); Maria G. Lam, Oakland, CA (US); Donna L. Polehn, Mercer Island, WA (US); Lalit R. Kotecha, San Ramon, CA (US); Arda Aksu, Lafayette, CA (US); Suzann Hua, Beverly Hills, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 91 days.

(21) Appl. No.: 17/246,369

(22) Filed: Apr. 30, 2021

(65) Prior Publication Data
US 2022/0353163 A1 Nov. 3, 2022

(51) Int. Cl.
*H04L 12/26* (2006.01)
*H04B 17/327* (2015.01)
(Continued)

(52) U.S. Cl.
CPC ....... *H04L 43/0888* (2013.01); *H04B 17/327* (2015.01); *H04L 43/10* (2013.01); *H04W 76/10* (2018.02)

(58) Field of Classification Search
CPC ............... H04L 43/0888; H04L 43/10; H04B 17/327; H04W 76/10
See application file for complete search history.

(56) References Cited

U.S. PATENT DOCUMENTS

2015/0148025 A1* 5/2015 Wei ................. H04W 16/08
455/418
2018/0092049 A1* 3/2018 Liu .................. H04W 24/10
(Continued)

OTHER PUBLICATIONS

3GPP TS 23.501 V16.7.0 (Dec. 2020), "3rd Generation Partnership Project; Technical Specification Group Services and System Aspects; System architecture for the 5G System (5GS); Stage 2 (Release 16)," Dec. 2020.
(Continued)

*Primary Examiner* — Derrick V Rose

(57) ABSTRACT

A system described herein may receive traffic throughput metrics and energy consumption metrics associated with one or more elements of a wireless network, and compute granular (e.g., per-network slice, per-network element, per-protocol, per-layer, etc.) measures of energy efficiency associated with the one or more one or more elements. The system may determine network parameter modifications based on the granular measures of energy efficiency, and/or provide such measures of energy efficiency to the one or more network elements, which may grant access to UEs 109 based on the granular measures of energy efficiency. The one or more network elements may make network parameter modifications based on the granular measures of energy efficiency, such as activating "sleep" or "suspend" modes, and/or otherwise performing energy saving techniques.

20 Claims, 12 Drawing Sheets

(51) Int. Cl.
   *H04W 76/10*     (2018.01)
   *H04L 43/0888*   (2022.01)
   *H04L 43/10*     (2022.01)

(56) References Cited

U.S. PATENT DOCUMENTS

2019/0223229 A1* 7/2019 Sharma ................. H04W 76/18
2021/0258865 A1* 8/2021 Park ....................... H04W 48/18
2022/0150726 A1* 5/2022 Laselva ............. H04W 52/0245

OTHER PUBLICATIONS

3GPP TS 28.554 V17.1.1 (Dec. 2020), "3rd Generation Partnership Project; Technical Specification Group Services and System Aspects; Management and orchestration; 5G end to end Key Performance Indicators (KPI) (Release 17)," Dec. 2020.

3GPP v38.300 V15.6.0 (Jun. 2019), "3rd Generation Partnership Project; Technical Specification Group Radio Access Network; NR; NR and NG-RAN Overall Description; Stage 2 (Release 15)," Jun. 2019.

* cited by examiner

SYSTEMS AND METHODS FOR MODIFYING PARAMETERS OF A WIRELESS NETWORK BASED ON GRANULAR ENERGY EFFICIENCY METRICS

BACKGROUND

Wireless networks, which may include radio access networks ("RANs"), may provide wireless service to User Equipment ("UEs"), such as mobile telephones, Internet of Things ("IoT") devices, Machine-to-Machine ("M2M") devices, or other devices with wireless communication capability. RANs may include wireless communication hardware, such as base stations, that serve as a wireless interface between UEs and a core networks that provides traffic routing and/or other services. The routing, forwarding, handling, etc. of traffic via the RAN (e.g., between UEs and the core network) may consume energy (e.g., electrical energy).

DETAILED DESCRIPTION OF EXAMPLE EMBODIMENTS

The following detailed description refers to the accompanying drawings. The same reference numbers in different drawings may identify the same or similar elements.

Embodiments described herein provide for the computation of energy efficiency of one or more elements of a RAN, and performing network configuration operations based on the computation of energy efficiency of the one or more elements of the RAN. As described herein, energy efficiency may be determined on a granular basis, such as on a per-network element basis, a per-network slice basis, and/or some other suitable basis or level of granularity. Generally, "energy efficiency" may be a function of amount of particular traffic transmitted, processed, handled, etc. by a given network element over a particular time period, as well as an amount of energy consumed by the network element in order to transmit, process, handle, etc. the particular traffic over the particular time period.

Figure 1:
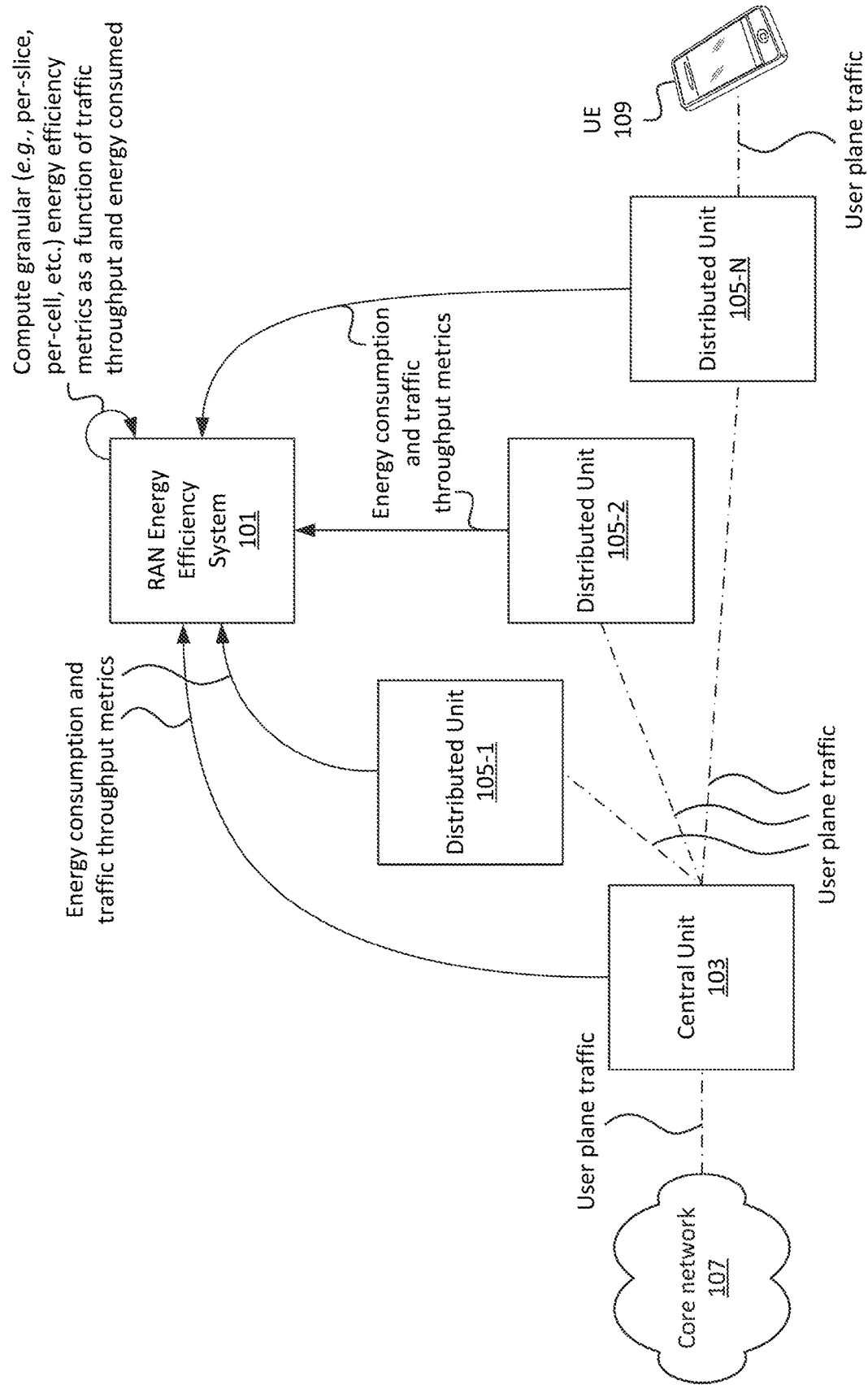
FIGS. 1 and 2 illustrate an example overview of one or more embodiments described herein.

For example, as shown in FIG. 1, RAN Energy Efficiency System ("REES") 101 may receive energy consumption and traffic throughput metrics from elements of a RAN, such as one or more Central Units ("CUs") 103 and one or more Distributed Units ("DUs") 105-1, 105-2, and 105-N. While one CU 103 and three DUs 105 are shown in FIG. 1, in practice, REES 101 may communicate with multiple CUs 103, additional DUs 105, fewer DUs 105, and/or one or more other network devices, systems, and/or Virtualized Network Function ("VNFs") not shown in this figure.

In some embodiments, the traffic throughput metrics may be provided to REES 101 by CU 103 and/or one or more DUs 105. For example, CU 103 and/or DUs 105 may implement an application programming interface ("API") or other suitable communication interface via which CU 103 and/or DUs 105 communicate with REES 101. Additionally, or alternatively, one or more other devices or systems that determine or collect the traffic throughput information associated with CU 103 and/or DUs 105 (e.g., a Service Capability Exposure Function ("SCEF"), a Network Exposure Function ("NEF"), or some other suitable device or system) may provide the traffic throughput metrics to REES 101. In some embodiments, REES 101 may receive the traffic throughput metrics on a periodic basis, an intermittent basis, and/or some other ongoing and/or iterative basis. In some embodiments, REES 101 may "pull" the traffic throughput metrics from CU 103 and/or DU 105 (e.g., by outputting requests, polling messages, etc. and receiving responses to such messages with the traffic throughput metrics). Additionally, or alternatively, CU 103 and/or DU 105 may "push" the traffic throughput metrics to REES 101 (e.g., without specific requests from REES 101, and/or independent of whether any such requests are received from REES 101).

As described below, the traffic throughput metrics may include "protocol-level" information, which may include header information and/or other information associated with traffic handled, processed, etc. by CU 103 and/or DU 105 at the various protocols used, and/or network layers at which CU 103 and/or DU 105 handle such traffic. For example, the header information and/or other information for a given set of traffic may include a source, a destination, a network slice (e.g., where a "slice" refers to a discrete set of network resources that provide differentiated service, such as varying levels of Quality of Service ("QoS")), an amount of traffic over time (e.g., a quantity of bits, packets, frames, protocol units, or the like), and/or other suitable information. In some embodiments, some or all of the protocol-level information associated with given traffic may be extracted from the traffic (e.g., from header information, payload information, etc.) itself.

In some embodiments, the traffic throughput metrics may include metrics relating to user plane traffic. In some embodiments, the traffic throughput metrics may include metrics relating to control plane traffic. In some embodiments, the traffic throughput metrics may include metrics relating to user plane traffic and control plane traffic.

For example, while CU 103 is shown here as "CU 103," in practice, CU 103 may be implemented in a Control/User Plane Separation ("CUPS") environment, in which user plane traffic may be handled by a CU-User Plane ("CU-UP") function, while control plane signaling may be handled by a CU-Control Plane ("CU-CP") function. Thus, in embodiments where traffic metrics include user plane traffic throughput metrics, "CU 103" as described herein may refer to a CU-UP function. In embodiments where traffic metrics include user control plane throughput metrics, "CU 103" as described herein may refer to a CU-CP function.

As shown, CU 103 (e.g., a CU-UP function) may communicate user plane traffic to and/or from core network 107. In some embodiments, core network 107 may, be include, and/or may be communicatively coupled to an Evolved Packet Core ("EPC"), a Fifth Generation ("5G") Core ("5GC"), and/or some other type of core network. CU 103 may also communicate user plane traffic to and/or from one or more DUs 105. For example, in the downlink direction (e.g., traffic destined for one or more UEs, such as UE 109), CU 103 may receive traffic from core network 107, may identify a particular DU 105 associated with UE 109, and may output the traffic to the particular DU 105, which may in turn wirelessly provide the traffic to UE 109. DU 105-N in this figure may be a DU 105 that has been selected by CU 103 and/or some other device or system to provide wireless service to UE 109 based on geographical proximity to UE 109, latency metrics between DU 105-N and UE 109, load metrics associated with DU 105-N and one or more other DUs 105, and/or other suitable factors. Similarly, in the uplink direction, DU 105-N may wirelessly receive traffic from UE 109, provide the received traffic to CU 103, which may in turn provide the traffic to core network 107. Core network 107 may proceed to provide the traffic to its destination (e.g., an application server, another UE 109, and/or some other device or system) via one or more networks, such as the Internet.

CU 103 and DUs 105 may also provide, to REES 101, energy consumption information. The energy consumption information may include granular energy consumption information, such as an amount of energy consumption over a given time period (e.g., kilowatt-hours ("kWh"), Joules ("J"), or some other suitable unit), a rate (e.g., an average, median, or some other value describing energy usage rates) of energy consumption over a given time (e.g., watts ("W"), J per second ("J/s"), or some other suitable unit), and/or other suitable energy usage information. In some embodiments, the energy consumption information may be "granular" in that CU 103 and/or DUs 105 may provide information indicating particular traffic attributes to which such energy usage metrics are applicable. For example, CU 103 and/or DUs 105 may determine that a particular amount of energy was used to decrypt, queue, handle, receive, output, and/or otherwise process traffic with certain attributes (e.g., traffic associated with a particular network slice, traffic associated with a particular UE 109 or group of UEs 109, traffic associated with a particular QoS level, traffic associated with a particular logical flow, etc.).

In some embodiments, CU 103 and/or DUs 105 may provide total (e.g., non-granular) energy usage metrics over a particular period of time, and REES 101 may compute granular energy usage metrics based on the total energy usage metrics based on an apportionment or other suitable procedure. For example, assume that DU 105-1 indicates that 100 Gigabytes ("GB") of traffic associated with a first network slice was processed by DU 105-1 over a particular time period, that 200 GB of traffic associated with a second network slice was processed by DU 105-1 over the particular time period, and that 300 GB of traffic associated with a third network slice was processed by DU 105-1 over the particular time period (i.e., 600 GB total traffic during the particular time period). Further assume that DU 105-1 indicates that 100 J of energy was used by DU 105-1 during the particular time period. REES 101 may apportion this 100 J of energy consumption over the particular time period based on the amounts of traffic associated with the different network slices processed by DU 105-1 over this time period. For example, REES 101 may determine that DU 105-1 consumed approximately 17 J (i.e., (100 GB/600 GB)*100 J) to process traffic associated with the first network slice, that DU 105-1 consumed approximately 33 J of energy to process traffic associated with the second network slice (i.e., (200 GB/600 GB)*100 J), and that DU 105-1 consumed approximately 50 J of energy to process traffic associated with the third network slice (i.e., (300 GB/600 GB)*100 J).

REES 101 may further compute a per-bit, per-packet, per-protocol unit, etc. measure of energy efficiency based on the granular (e.g., per-slice) traffic throughput and energy consumption metrics discussed above. For example, further assume that REES 101 receives information indicating that DU 105-1 processed 1,000 packets associated with the first network slice during the particular time period, that DU 105-1 processed 3,000 packets associated with the second network slice during the particular time period, and that that DU 105-1 processed 4,000 packets associated with the third network slice during the particular time period. REES 101 may compute the energy efficiency of DU 105-1 for each slice as a function of the quantity of packets associated with each slice processed during the particular time period and the energy consumed for the respective slice.

Continuing with the example above, the energy efficiency of DU 105-1 with respect to the first slice may be approximately 59 packets/J (1,000 packets/17 J). Further, the energy efficiency of DU 105-1 with respect to the second slice may be approximately 91 packets/J (3,000 packets/33 J), and the energy efficiency of DU 105-1 with respect to the third slice may be approximately 40 packets/J (4,000 packets/100 J). Thus, in this example, DU 105-1 may be "more efficient" or "most efficient" with respect to the second slice (e.g., more packets per energy consumed), and may be "less efficient" or "least efficient" with respect to the third slice (e.g., fewer packets per energy consumed). In some embodiments, REES 101 may utilize a function or formula that is different from the above-described computation in order determine energy efficiency. For example, REES 101 may determine energy efficiency based on one or more additional variables, constants, coefficients, or the like.

As another example, REES 101 may compute a per-bit, per-packet, per-protocol unit, etc. measure of energy efficiency on another basis in addition to, or in lieu of, a per-slice basis. For example, REES 101 may compute a per-bit, per-packet, per-protocol unit, etc. measure of energy efficiency associated with a particular cell associated with a particular base station, DU 105, and/or some other RF element of a RAN. For example, a "cell" may refer to a particular set of carriers (e.g., frequencies, frequency bands, etc.) used in a particular sector (e.g., coverage area) associated with a particular RF element such as a base station, DU 105, etc. As another example, REES 101 may compute a measure of energy efficiency on a per-carrier basis, a per-sector basis, a per-RF element (e.g., per-base station basis, per-DU basis, etc.), a per-application or per-application type basis (e.g., voice calls, data traffic, messaging traffic, traffic associated with particular applications as indicated in header information, etc.), and/or on some other basis.

For example, as noted above, REES 101 may receive information from CU 103, DU 105, and/or one or more other devices or systems amounts of traffic received, processed, handled, etc. by such devices or systems, which may include header information or other suitable information based on which REES 101 may determine the per-bit, per-packet, per-slice, per-network element, per-cell, etc. traffic throughput metrics. As also noted above, REES 101 may receive information from CU 103, DU 105, and/or one or more other devices or systems indicating amounts of energy consumed to receive, process, handle, etc. traffic with particular attributes or categories (e.g., slices, applications, cells, etc.) for each attribute or category of the traffic. Additionally, or alternatively, as discussed above, REES 101 may determine energy consumption, for a particular traffic attribute or category, as a function of total energy consumed by a given network element over a given time window, total traffic throughput handled by the network element over the given time window, and traffic throughput associated with the particular traffic attribute or category over the given time window.

In some embodiments, REES 101 may compute a score based on the energy efficiency determined on a per-slice, per-traffic type, per-protocol unit, etc. basis. For example, REES 101 may compute an energy efficiency score on a normalized scale (e.g., 1-100, 1-1,000, and/or some other scale) based on granular traffic throughput metrics and energy consumption metrics, as discussed above.

Figure 2:
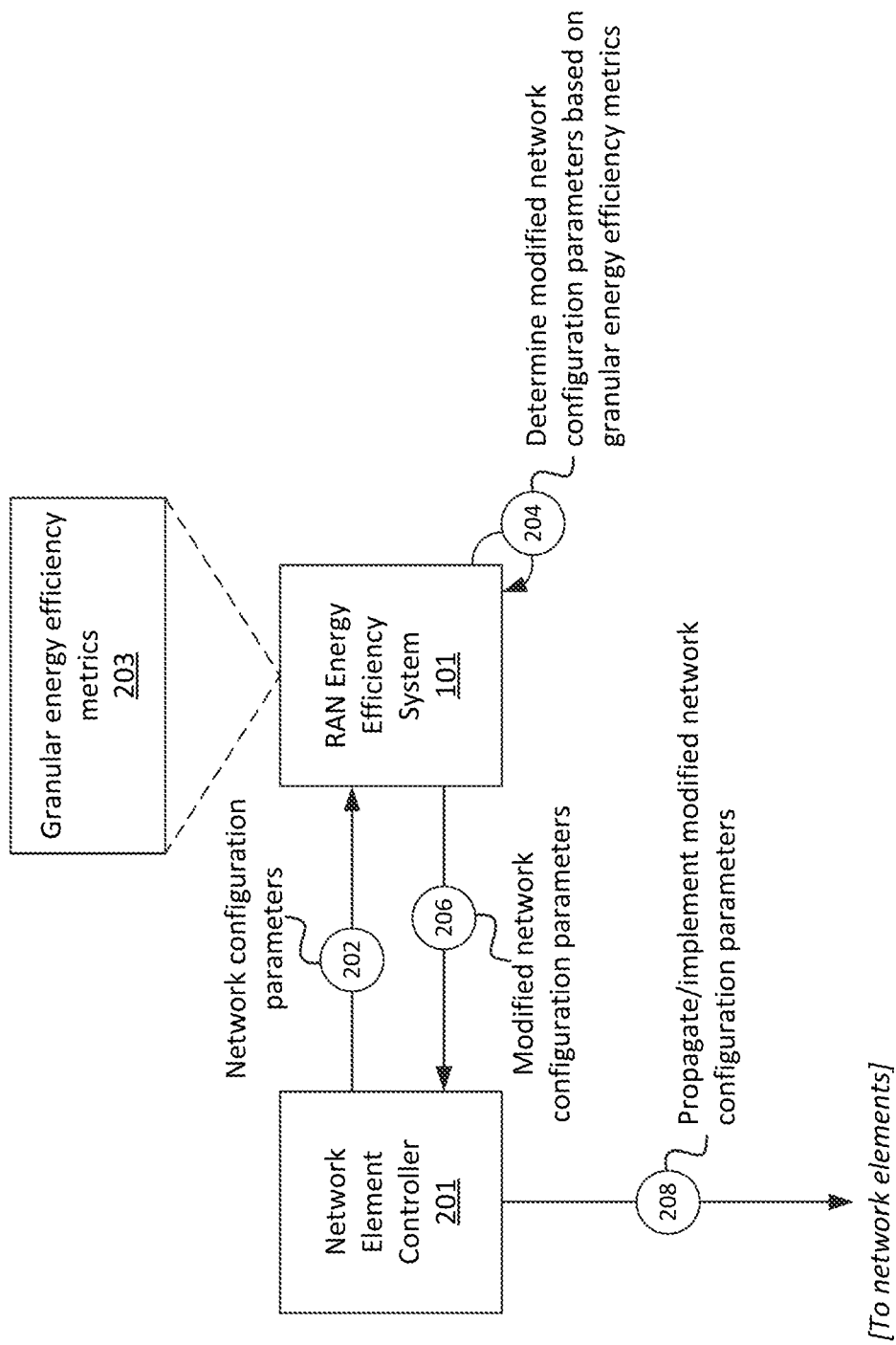

Based on the computed granular energy efficiency metrics and/or scores, REES 101 may determine one or more modifications to parameters of the network in order to improve the energy efficiency of the network, thus reducing energy consumption of the network. For example, as shown in FIG. 2, REES 101 may be communicatively coupled to network element controller 201. Network element controller 201, as discussed herein, refers to a device or system that is capable of providing information regarding network configuration parameters (e.g., network topology information and/or other types of parameters discussed herein), and/or modifying network configuration parameters. In some embodiments, network element controller 201 may be or may include an orchestration system associated with a virtualized environment, which may be capable of provisioning resources for various VNFs, de-provisioning resources for various VNFs, instantiating or de-instantiating VNFs at data centers or other physical locations, and/or other suitable functions. In some embodiments, network element controller 201 may be or may include a particular network function of a RAN or core network, such as an Access and Mobility Management Function ("AMF"), a Mobility Management Entity ("MME"), a base station baseband controller, a CU, a Session Management Function ("SMF"), a Serving Gateway ("SGW"), an Network Repository Function ("NRF"), and/or other suitable device or system.

REES 101 may receive (at 202) network configuration parameters from network element controller 201 (e.g., via "push" and/or "pull" techniques). For example, the network configuration parameters may indicate particular cells associated with a base station of a RAN (e.g., cells implemented by one or more DUs 105 and/or other suitable RF hardware). As noted above, a cell implemented by a given base station may refer to a set of carriers, frequencies, etc. implemented by the base station within a particular sector. Thus, multiple cells may refer to multiple carriers implemented within a given sector, the same set of carriers implemented at multiple sectors, and/or multiple carriers implemented within multiple sectors. As another example, the network configuration parameters may indicate a location and/or coverage areas associated with multiple DUs 105 (and/or other RF hardware) communicatively coupled to a particular CU 103 (and/or a other type of RAN control system). In some embodiments, the network configuration parameters may include a location and/or coverage areas associated with multiple base stations in a RAN. As yet another example, the network configuration parameters may include indications of slices supported by different network elements in a RAN (e.g., where certain devices or systems of the RAN are capable of providing levels of service associated with different slices).

REES 101 may further receive, determine, etc. (e.g., as discussed above with respect to FIG. 1) granular energy efficiency metrics 203, which may include energy efficiency metrics on the basis of different slices, different CUs 103, different DUs 105, different traffic application types, and/or some other suitable basis. REES 101 may further determine (at 204) modified network configuration parameters based on the received network configuration parameters and granular energy efficiency metrics 203. In some embodiments, and as discussed below in greater detail, such modifications may include modifying cell selection parameters or criteria (e.g., when UE 109 initially connects to a RAN and/or participates in an intra-RAN or inter-RAN handover procedure), modifying DU 105 selection parameters or criteria (e.g., where a particular DU 105 is assigned to serve a given UE 109 based on such parameters or criteria), modifying base station selection criteria (e.g., when UE 109 is within coverage areas of multiple base stations), slice selection parameters or criteria, suspending or reducing operation of one or more cells or slices, suspending or reducing operation of one or more DUs 105 and/or other devices or systems, or other suitable modifications. In some embodiments, determining (at 204) modified network configuration parameters may include, and/or may be based on, one or more energy efficiency scores and/or measures of energy efficiency computed by REES 101 based on granular energy efficiency metrics 203. In some embodiments, the suspending or reducing operation of a given device or system may include causing the device or system to cease operations and/or enter a "sleep" mode or a "low power" mode on a periodic or intermittent basis, which may reduce the amount of energy consumed by the device or system.

REES 101 may output (at 206) the modified network configuration parameters to network element controller 201, which may propagate and/or implement (at 208) the modified network configuration parameters. In this manner, REES 101 may continuously improve the energy efficiency (e.g., amount of traffic processed per energy consumed) of various elements of one or more RANs or other types of networks (e.g., by continuously monitoring the energy efficiency of the various elements and outputting modified network configuration parameters based on the monitoring). In some embodiments, REES 101 may utilize one or more artificial intelligence/machine learning ("AI/ML") techniques (e.g., unsupervised AI/ML techniques) to identify and implement optimal (e.g., in terms of energy efficiency) network configuration parameters. FIGS. 4-7, described below, provide further examples of some or all of the operations shown in FIG. 2, including more detailed examples of modifications to network configuration parameters determined based on granular energy efficiency metrics 203.

Figure 3:
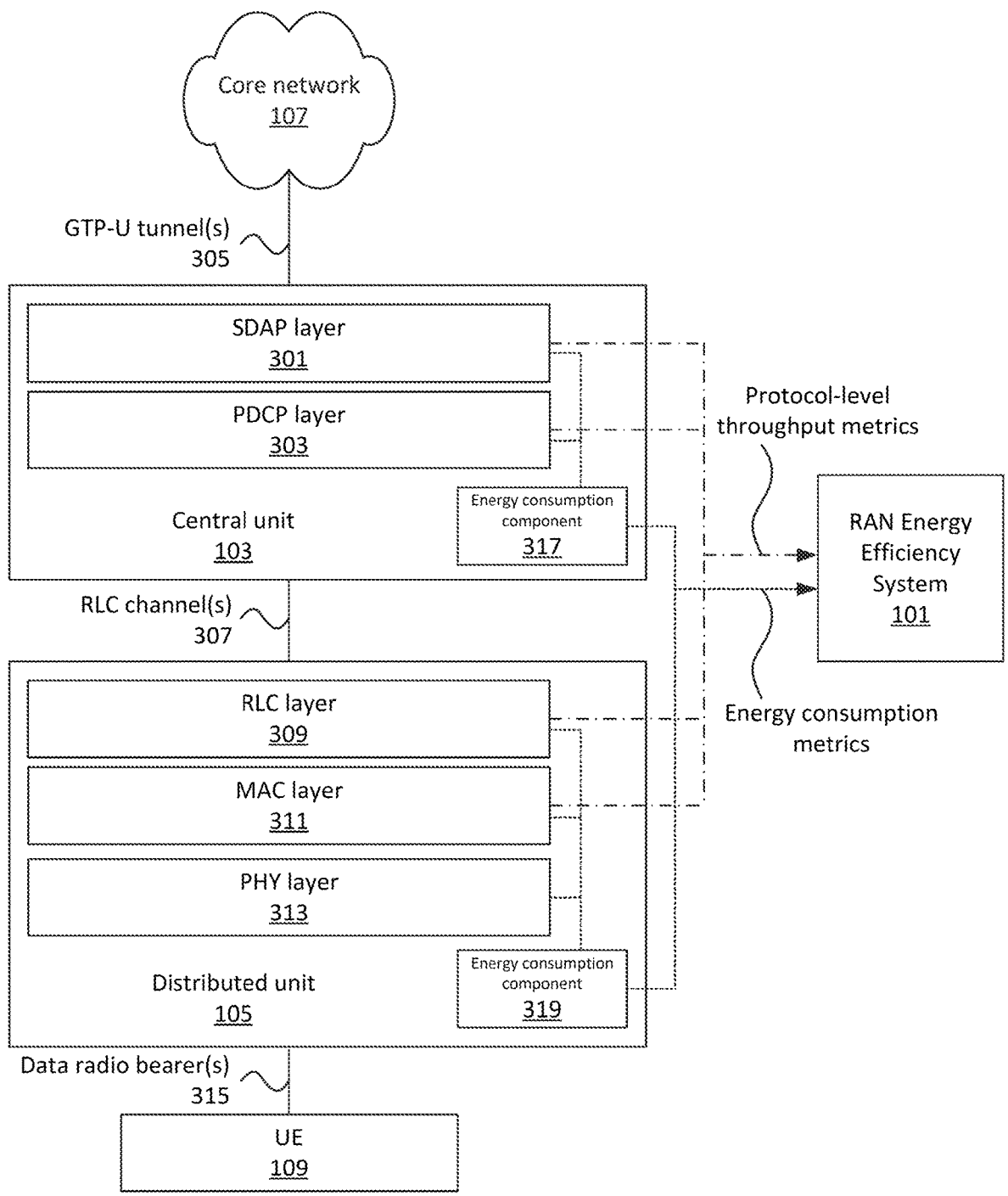
FIG. 3 illustrates a monitoring of protocol-level throughput metrics and energy consumption metrics, in accordance with some embodiments.

FIG. 3 illustrates an example of the monitoring of protocol-level (e.g., per-packet, per-frame, per-protocol unit, etc.) throughput metrics and energy consumption metrics associated with one or more CUs 103 and/or DUs 105. As shown, CU 103 may implement Service Data Application Protocol ("SDAP") layer 301 and Packet Data Convergence Protocol ("PDCP") layer 303. SDAP layer 301 may be used to communicate with core network 107 (e.g., via one or more General Packet Radio Service ("GPRS") Tunneling Protocol ("GTP")-User plane ("GTP-U") tunnels 305). For example, SDAP layer 301 may send and/or receive GTP packets to and/or from core network 107 via one or more GTP-U tunnels 305. In some embodiments, different GTP-U tunnels 305 may be associated with different network slices, QoS flows, or the like. In some embodiments, GTP packets may include header information and/or other suitable information indicating network slices, QoS flows (e.g., QoS Flow Identifier ("QFI") markings), Network Slice Selection Assistance Information ("NSSAI") markings, or other information based on which an amount of uplink and/or downlink traffic may be identified on a granular basis.

PDCP layer 303 may communicate with one or more DUs 105 via one or more Radio Link Control ("RLC") channels 307. For example, PDCP layer 303 may output PDCP protocol data units ("PDUs") to DU 105 based on downlink traffic received from core network 107 (e.g., via SDAP layer 301) after performing header compression and/or decompression, PDCP PDU duplication, ciphering, and/or other suitable functions. As another example, PDCP layer 303 may generate PDCP PDUs and/or perform other suitable functions based on uplink RLC packets received from one or more DUs 105 (e.g., via one or more RLC channels 307). PDCP PDUs may include header information and/or other suitable information indicating network slices, QoS flows (e.g., QFI markings), NSSAI markings, or other information based on which an amount of uplink and/or downlink traffic may be identified on a granular basis.

As further shown, a particular DU 105 may implement RLC layer 309, Media Access Control ("MAC") layer 311, and physical ("PHY") layer 313. RLC layer 309 may perform functions such as error correction, sequencing, and/or other suitable functions. MAC layer 311 may maintain and/or utilize a mapping between network slices, QoS flows, etc. and physical transmission or reception parameters associated with PHY layer 313. For example, MAC layer 311 may maintain information based on which particular MAC PDUs generated by MAC layer 311 and/or traffic received wirelessly via PHY layer 313 (e.g., via one or more data radio bearers 315) may be identified as being associated with a given network slice, QoS flow, etc.

As shown in FIG. 3, REES 101 may receive protocol-level throughput metrics associated with each one of layers 301, 303, 309, and 311. In some embodiments, REES 101 may not receive throughput metrics associated with both MAC layer 311 and PHY layer 313, as such information may be redundant. That is, in some embodiments, the amount of traffic associated with MAC layer 311 and PHY layer 313 may be expressed in the same or similar manner (e.g., quantity of MAC PDUs), and REES 101 may thus not obtain protocol-level throughput metrics associated with both layers 311 and 313. In some embodiments, REES 101 may obtain throughput metrics associated with MAC layer 311 and PHY layer 313, and/or one or more other layers not shown in this figure.

REES 101 may also receive energy consumption information associated with CU 103 and DU 105. For example, CU 103 may include energy consumption component 317, and DU 105 may include energy consumption component 319, which may provide energy consumption metrics associated with CU 103 and DU 105, respectively. For example, as energy consumption component 317 and energy consumption component 319 may be connected to one or more power supplies associated with CU 103 and DU 105, respectively, and may measure an amount of energy consumed by CU 103 and DU 105, respectively, over a given time window. Further, energy consumption component 317 and energy consumption component 319 may output information indicating the amount of energy consumed by CU 103 and DU 105, respectively, to REES 101 via one or more APIs or other suitable communication pathways.

Additionally, or alternatively, energy consumption component 317 may receive energy consumption metrics specific to one or more respective layers associated with CU 103, and/or energy consumption component 319 may receive energy consumption metrics specific to one or more respective layers associated with DU 105, and may report such information to REES 101. In some embodiments, energy consumption component 319 may receive information used to power one or more antennas and/or other RF circuitry associated with PHY layer 313. REES 101 may determine granular energy efficiency metrics based on the received protocol-level throughput metrics and energy consumption metrics, as similarly described above.

Figure 4:
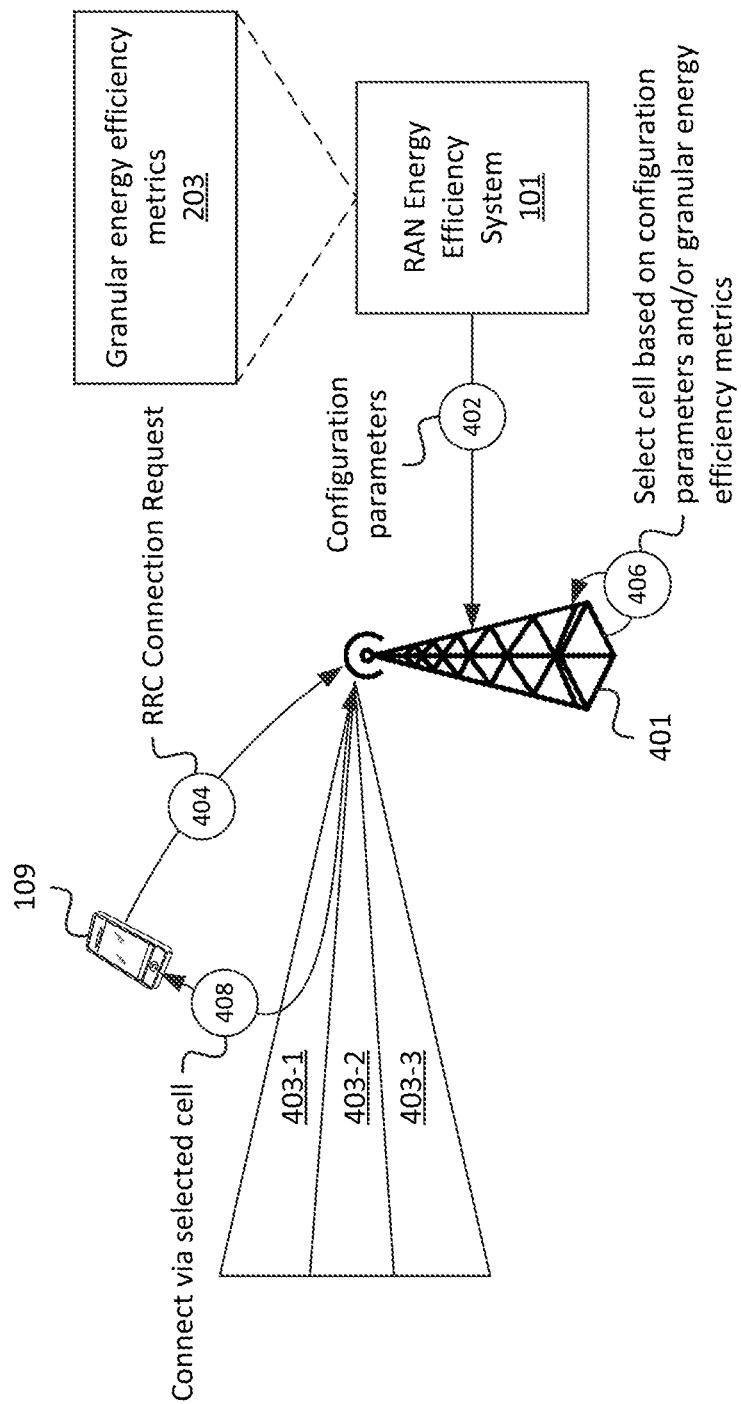
FIGS. 4-7 illustrate examples of providing network access and/or modifying network parameters based on granular energy efficiency metrics, in accordance with some embodiments.

FIGS. 4-7 illustrate examples of network configuration modifications that may be performed based on granular energy efficiency metrics 203 computed by REES 101, in order to enhance the energy efficiency of various aspects of one or more wireless networks. For example, as shown in FIG. 4, base station 401 may receive (at 402) configuration parameters from REES 101, which may be generated by REES 101 based on granular energy efficiency metrics 203, as similarly described above. For example, granular energy efficiency metrics 203 may have been generated based on traffic throughput metrics (e.g., protocol-level traffic throughput metrics) associated with base station 401 and/or one or more other devices or systems, and energy consumption metrics associated with base station 401 and/or one or more other devices or systems.

In this example, the configuration parameters provided by REES 101 may include parameters related to cells 403 implemented by base station 401. For example, the configuration parameters may indicate a ranking, weighting, score, and/or other value associated with one or more cells 403 implemented by base station 401, such as example cells 403-1, 403-2, and/or 403-3. For example, the configuration parameters may include energy efficiency scores and/or measures of energy efficiency, indicating that cell 403-1 is more energy efficient than cells 403-2 and 403-3. Based on the configuration parameters, base station 401 may select cell 403-1 (e.g., in lieu of cells 403-2 and/or 403-3) for UEs 109 that connect to base station 401. Additionally, or alternatively, base station 401 may utilize the energy efficiency metrics and/or scores as a factor in selecting a particular cell 403 for a particular UE 109.

For example, as shown, UE 109 may output (at 404) a Radio Resource Control ("RRC") Connection Request to base station 401, and base station 401 may select (at 406) a particular cell 403-1, out of the set of cells that include cells 403-1, 403-2, and 403-3, to which UE 109 should connect. For example, base station 401 may select cell 403-1 based on cell 403-1 having a highest energy efficiency score out of cells 403-1, 403-2, and 403-3. As noted above, the energy efficiency scores may be one factor out of several factors, based on which base station 401 selects cell 403-1. For example, cell 403-1 may be associated with a lower energy efficiency score than cell 403-2, but base station 401 may select cell 403-1 for the connection between base station 401 and UE 109 based on factors such as geographical location of UE 109 (e.g., within a coverage area associated with cell 403-1 rather than within a coverage area associated with cell 403-2), quantity of UEs connected to cells 403-1 and 403-2 (e.g., cell 403-1 may have more capacity than cell 403-2), and/or other suitable factors. Base station 401 may output (at 408) an indication to UE 109, such as an RRC Reconfiguration Request or other suitable message, indicating that UE 109 should connect to base station 401 via cell 403-1.

In some embodiments, base station 401 may modify one or more other configuration parameters based on the configuration parameters received (at 402) from REES 101. For example, base station 401 may modify one or more broadcast messages, such as Master Information Blocks ("MIBs") or System Information Blocks ("SIBs"), which indicate the availability, preference, ranking, or presence of particular cells 403. Additionally, or alternatively, base station 401 and/or one or more other base stations 401 may modify an order or ranking of cells 403 in one or more MIBs, SIBs, Neighbor Cell Lists ("NCLs"), and/or other suitable rankings or lists of cells 403. In some embodiments, base station 401 may remove one or more cells 403 from such rankings, lists, broadcasts, etc. based on an energy efficiency score associated with a respective cell 403 being below a threshold energy efficiency score. For example, base station 401 may "suspend," "sleep," "power off," etc. one or more cells 403 that are associated with an energy efficiency score that is below a threshold energy efficiency score.

While FIG. 4 is described in the context of UE 109 outputting (at 404) an RRC Connection Request, similar concepts may apply for any suitable cell selection or reselection procedure. In some embodiments, similar concepts may apply for a handover procedure (e.g., where base station 401 is a "target" base station in a handover of UE 109 from another "source" base station). Further, while FIG. 4 is described in the context of cells 403 implemented by a particular base station 401, similar concepts may apply to cells implemented by one or more DUs 105 or other RF network elements.

Figure 5:
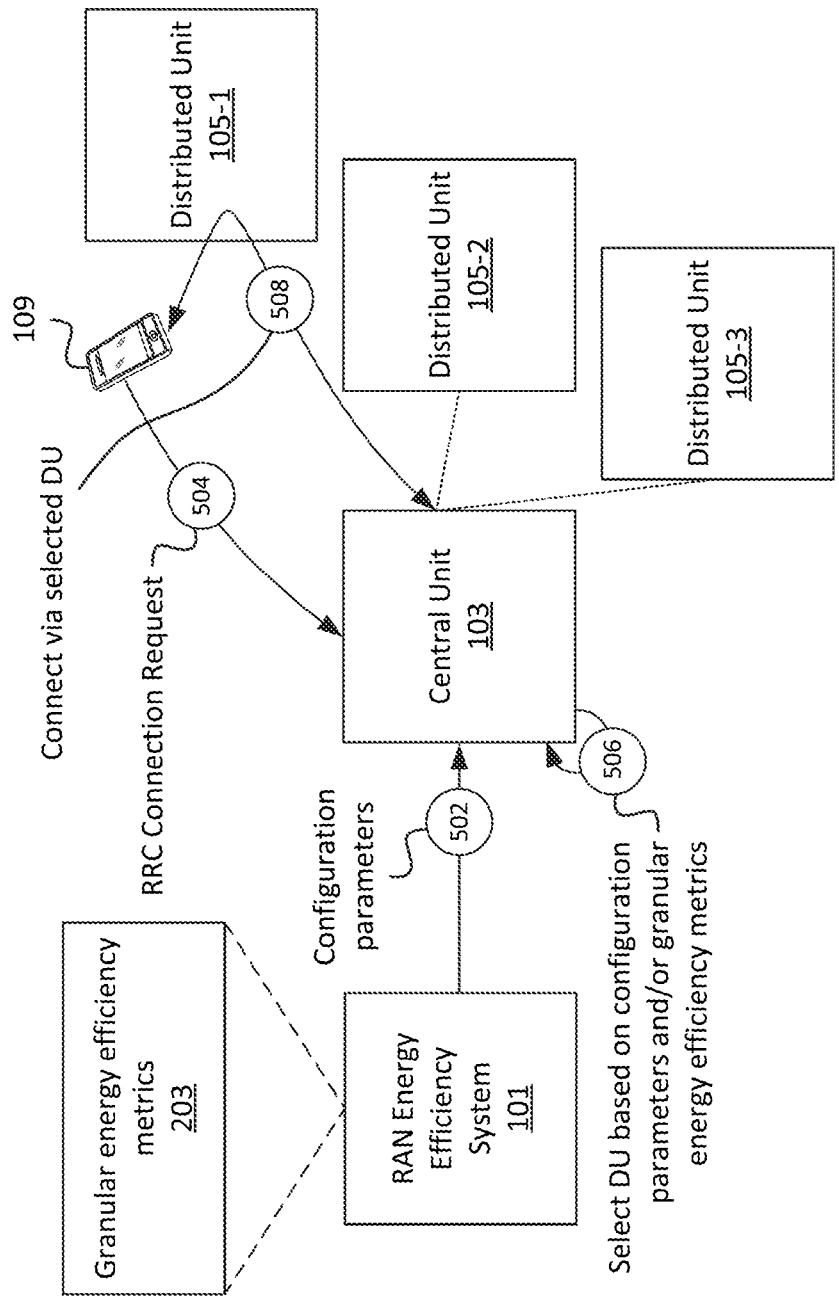

FIG. 5 illustrates another example of how elements of a RAN may utilize modified configuration parameters generated based on granular energy efficiency metrics 203. For example, as shown, CU 103 may receive (at 502) configuration parameters from REES 101, generated based on granular energy efficiency metrics 203 (e.g., granular energy efficiency metrics 203 based on monitoring energy consumption and/or traffic throughput at CU 103, one or more DU 105 communicatively coupled to CU 103, and/or one or more other devices or systems). As similarly noted above, the configuration parameters received from REES 101 may include one or more energy efficiency scores and/or other measures of energy efficiency associated with CU 103, DUs 105, and/or one or more granular traffic or network parameters (e.g., per-slice energy efficiency scores, per-traffic application type energy efficiency scores, etc.).

CU 103 may receive (at 504) an RRC Connection Request and/or other indication that UE 109 should connect to one or more DUs 105 communicatively coupled to CU 103 (e.g., a handover request or command). CU 103 may select (at 506) a particular DU 105 to which UE 109 should connect, based on the received configuration parameters. For example, CU 103 may select the most energy efficient (e.g., as indicated by one or more energy efficiency scores and/or metrics) DU 105 (e.g., DU 105-1 in this example), to which UE 109 should connect. As similarly discussed above, CU 103 may select DU 105-1 based on one or more other factors. In such situations, DU 105-1 may not be associated with the highest energy efficiency score, but the energy efficiency score in conjunction with the one or more other factors may result in the selection of DU 105-1. Based on the selection of DU 105-1, CU 103 may cause UE 109 to connect to DU 105-1. For example, CU 103 may output (at 508) an indication to DU 105-1 and/or UE 109 (e.g., via DU 105-1) that UE 109 should connect to DU 105-1.

In some embodiments, CU 103 may make one or more configuration parameter modifications based on the configuration parameters received (at 502) from REES 101. For example, CU 103 may cause one or more DUs 105 to enter a "sleep" status, may cause one or more DUs 105 to disable one or more carriers or cells associated with respective DUs 105, and/or other suitable modifications.

Figure 6:
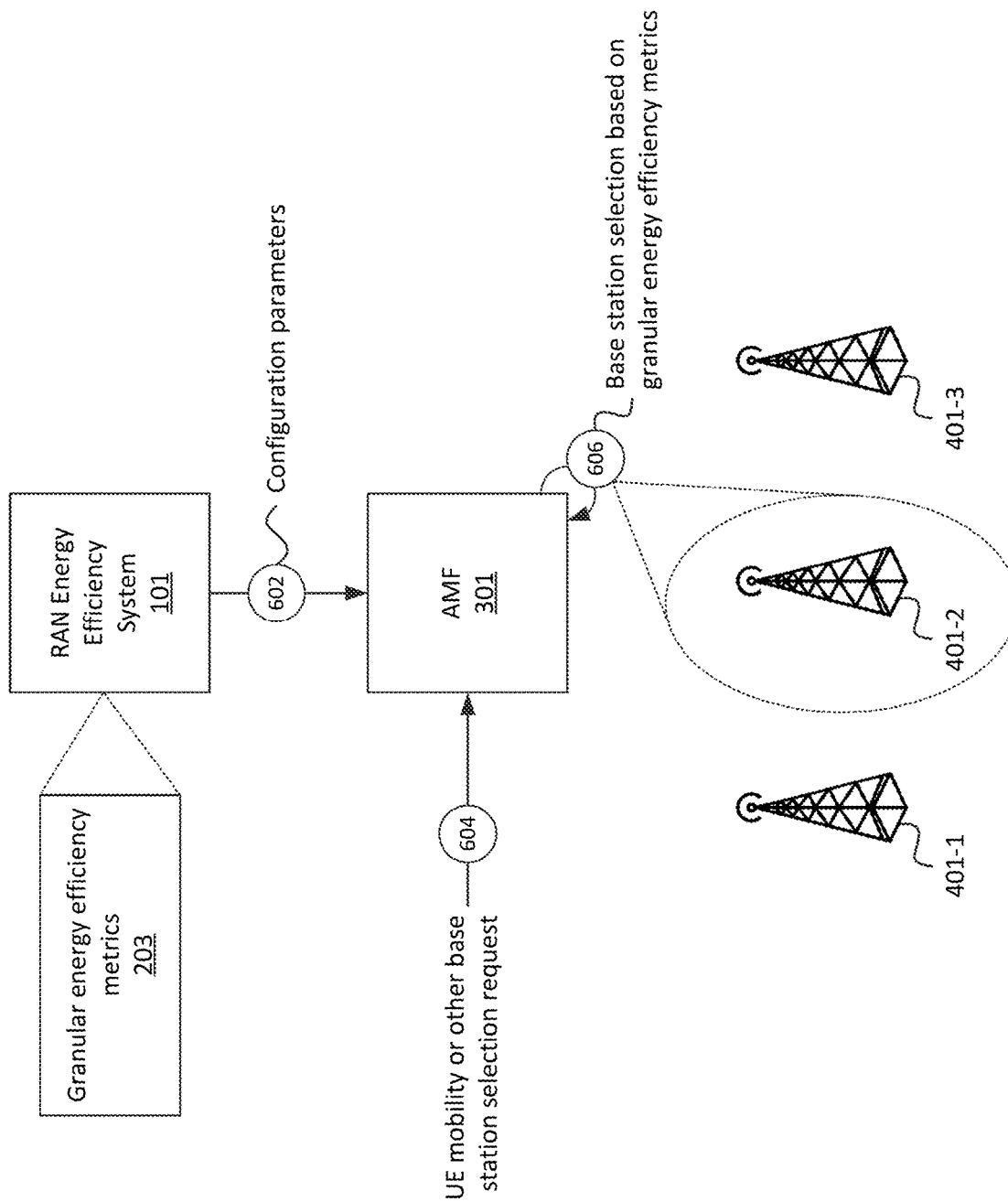

FIG. 6 illustrates an example of how one or more elements of a core network may utilize granular energy efficiency metrics to enhance the energy efficiency of the network. For example, as shown, a mobility element of the core network (e.g., AMF 301) may receive (at 602) configuration parameters, energy efficiency scores, granular energy efficiency metrics, etc. from REES 101. SDAP layer 301 may also receive or determine (at 604) a mobility event and/or base station selection request associated with a given UE 109, such as a handover request, a determination that UE 109 should be handed over from one base station 401 to another, and/or some other sort of procedure in which AMF 301 selects a particular base station 401. In this example, SDAP layer 301 may select (at 606) base station 401-2, out of a set of base stations 401-1, 401-2, and 401-3, based on the received (at 602) configuration parameters and/or energy efficiency scores. As similarly noted above, base station 401-2 may be associated with the highest energy efficiency score, and/or the energy efficiency score of base station 401-2 in conjunction with one or more other factors may result in the selection of base station 401-2 in lieu of base station 401-1 or 401-3.

Figure 7:
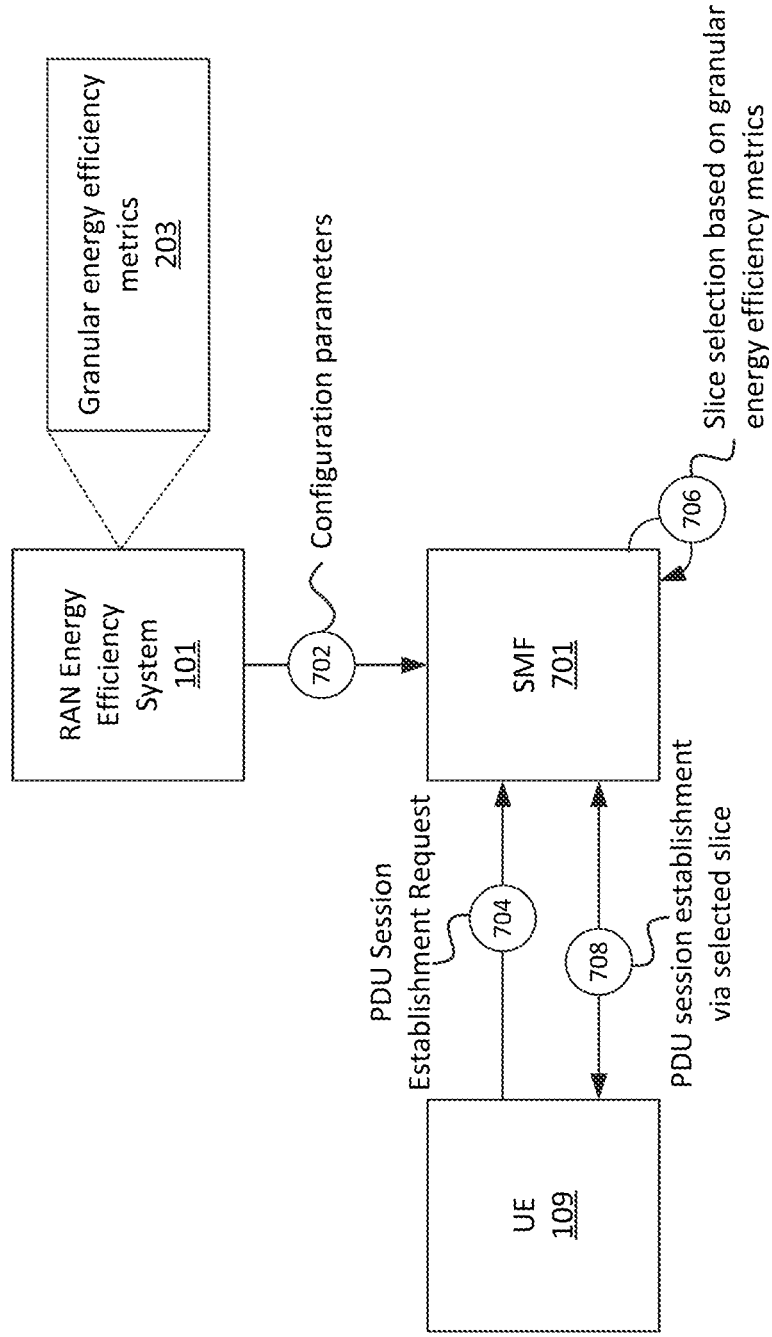

FIG. 7 illustrates another example of how one or more elements of a core network may utilize granular energy efficiency metrics to enhance the energy efficiency of the network. For example, as shown, a session management element of a core network (e.g., SMF 701) may receive (at 702) configuration parameters, energy efficiency scores, granular energy efficiency metrics, etc. from REES 101. SMF 701 may also receive (at 704) a session establishment request associated with UE 109, such as a PDU Session Establishment Request.

SMF 701 may select (at 706) a particular slice for the requested session based on the received (at 702) configuration parameters and/or energy efficiency scores. For example, SMF 701 may accept and/or authorize a slice requested in the PDU Session Establishment Request if the slice is associated with an energy efficiency score that exceeds a threshold energy efficiency score. As another example, SMF 701 may select a slice associated with a highest energy efficiency score. As yet another example, SMF 701 may select a particular slice based on multiple factors including the energy efficiency scores associated with multiple slices. SMF 701, UE 109, and/or one or more intervening devices or systems (e.g., a base station, CU 103, DU 105, and/or one or more other devices or systems) may complete (at 708) the session establishment via the particular selected slice.

Figure 8:
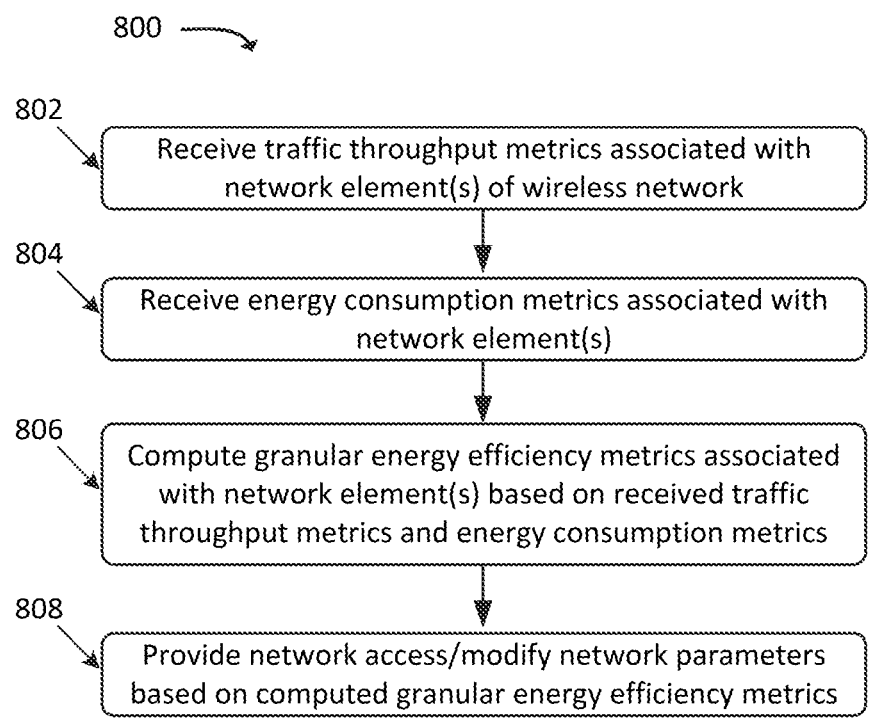
FIG. 8 illustrates an example process for providing network access and/or modifying network parameters based on granular energy efficiency metrics, in accordance with some embodiments.

FIG. 8 illustrates an example process 800 for providing network access and/or modifying network parameters based on granular energy efficiency metrics. In some embodiments, some or all of process 800 may be performed by REES 101. In some embodiments, one or more other devices may perform some or all of process 800 (e.g., in concert with, and/or in lieu of, REES 101, such as CU 103, DU 105, AMF 301, SMF 701, an MME, a SGW, and/or some other device or system).

As shown, process 800 may include receiving (at 802) traffic throughput metrics associated with one or more network elements of a wireless network. For example, as discussed above, REES 101 may receive throughput metrics associated with CU 103 (e.g., a CU-UP, a CU-CP, and/or both a CU-UP and a CU-CP), DU 105, a base station of a RAN, and/or one or more other devices or systems that route, provide, handle, process, etc. traffic associated with one or more UEs 109. In some embodiments, the traffic throughput metrics may include throughput metrics relating only to user plane traffic, and not control plane traffic. In some embodiments, the traffic throughput metrics may include throughput metrics relating to control plane traffic in addition to, or in lieu of, user plane traffic. As noted above, the traffic throughput metrics may include header information and/or other information based on which granular traffic throughput metrics may be determined, such as on the basis of traffic throughput associated with a particular network slice, traffic throughput associated with a particular application type, traffic throughput associated with a particular UE 109 or group of UEs 109, uplink and/or downlink traffic, and/or other identifiable traffic attributes. As further noted above, the traffic throughput metrics may indicate a quantity of packets, frames, PDUs, and/or other units associated with particular protocols implemented at various layers of the one or more network elements.

Process 800 may further include receiving (at 804) energy consumption metrics associated with the one or more network elements. For example, as discussed above, REES 101 may receive information indicating an amount of energy consumed (e.g., kWh, J, or some other suitable unit of energy consumed over time) by the one or more network elements. The energy consumption metrics may be associated with the same time period or time window with which the traffic throughput metrics (received at 802) are associated. In some embodiments, the energy consumption metrics may be provided with an indication of particular layers of the one or more devices with which the energy consumption metrics are associated. For example, DU 105 may indicate an amount of energy consumed by a PHY layer of DU 105, an amount of energy consumed by a MAC layer of DU 105, etc. In some embodiments, the energy consumption metrics associated with a given network element may indicate a total amount of energy consumed by the network element of the particular period of time.

Process 800 may additionally include computing (at 806) granular energy efficiency metrics associated with the one or more network elements based on the received traffic throughput metrics and energy consumption metrics. In some embodiments, as discussed above, REES 101 may apportion the total energy consumed based on the quantity of traffic throughput associated with each layer associated with the given network element, such that the amount of energy consumed by each layer may be identified, determined, estimated, etc. as a function of the amount of traffic processed at each layer by the given network element. In some embodiments, REES 101 may determine the energy efficiency of the one or more network elements as a function of one or more traffic attributes associated with the traffic, such as a per-slice measure of energy efficiency, a per-slice and per-layer measure of energy efficiency, a per-cell measure of energy efficiency, a per-DU measure of energy efficiency, and/or one or more other suitable measures of energy efficiency. In some embodiments, REES 101 may compute an energy efficiency score based on the measures of energy efficiency, where such energy efficiency scores may also be on a granular basis (e.g., a per-slice energy efficiency score, a per-slice and per-layer energy efficiency score, a per-cell energy efficiency score, a per-DU energy efficiency score, etc.).

Process 800 may also include providing (at 808) access and/or modifying network parameters based on the computed granular energy efficiency metrics. For example, as discussed above, REES 101 may output the granular energy efficiency metrics to one or more elements of the wireless network (e.g., the network elements for which the energy efficiency metrics were calculated, and/or one or more other network elements for which the energy efficiency metrics were not calculated). Such network elements may grant access to one or more UEs 109 in a manner that is based on the energy efficiency metrics, such as selecting a particular network slice for UE 109 to access the network, a particular DU 105 to which UE 109 should connect (e.g., during an initial connection procedure and/or during a handover procedure), a particular base station to which UE 109 should connect, a particular cell to which UE 109 should connect, etc. Further, such network elements may modify network parameters such as rankings of cells and/or DUs 105 (e.g., where such rankings may be provided via a SIB, a MIB, an NCL, etc. and/or may be used during a cell reselection process or other suitable procedure), power management configurations (e.g., periodically and/or intermittently activating a "sleep" mode or other power management procure), and/or may perform other network modifications based on the granular energy efficiency metrics.

Figure 9:
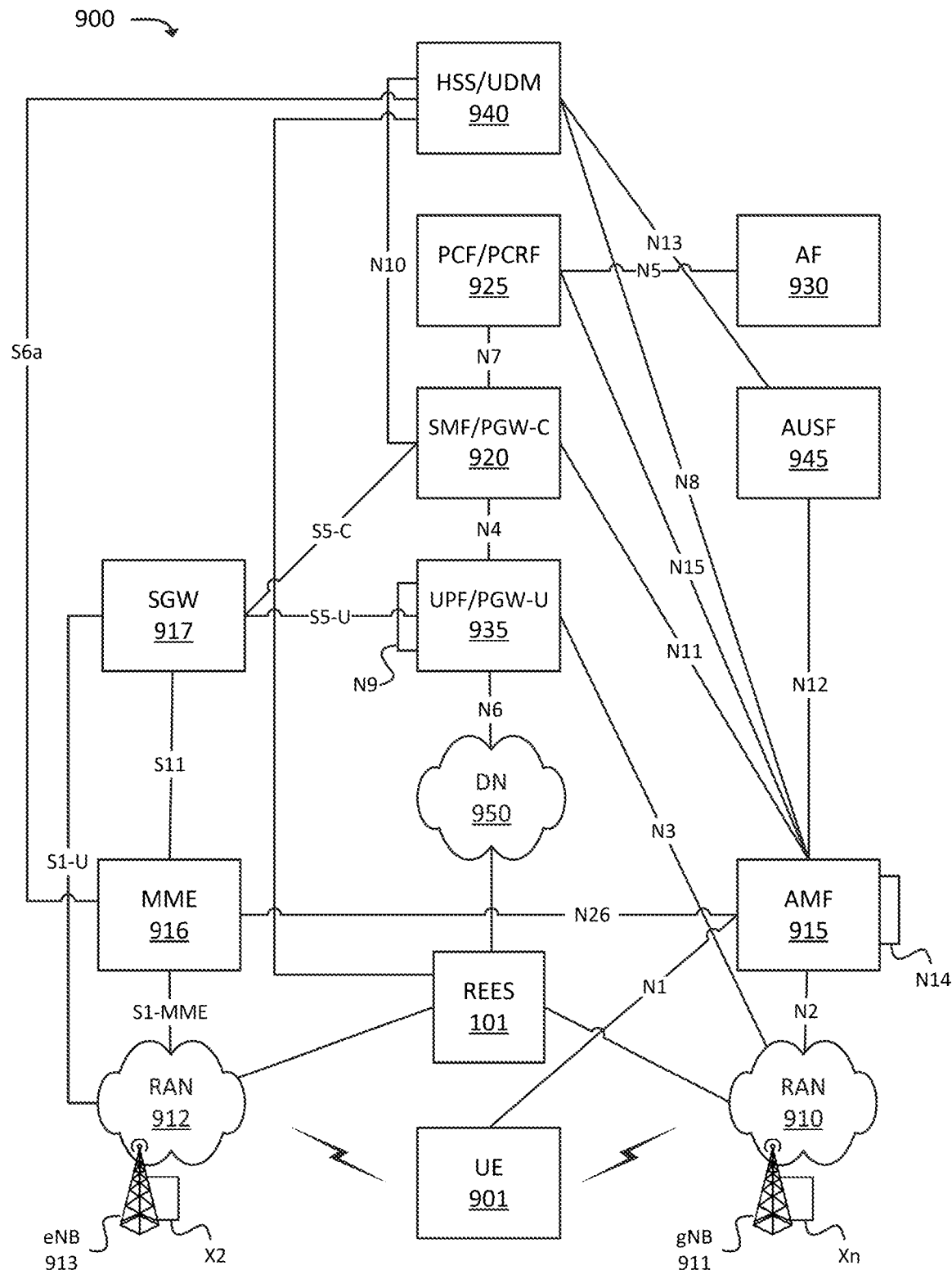
FIG. 9 illustrates an example environment in which one or more embodiments, described herein, may be implemented.

FIG. 9 illustrates an example environment 900, in which one or more embodiments may be implemented. In some embodiments, environment 900 may correspond to a Fifth Generation ("5G") network, and/or may include elements of a 5G network. In some embodiments, environment 900 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 900 may include UE 109, RAN 910 (which may include one or more Next Generation Node Bs ("gNBs") 911), RAN 912 (which may include one or more one or more evolved Node Bs ("eNBs") 913), and various network functions such as AMF 915, MME 916, SGW 917, SMF/Packet Data Network ("PDN") Gateway ("PGW")-Control plane function ("PGW-C") 920, Policy Control Function ("PCF")/Policy Charging and Rules Function ("PCRF") 925, Application Function ("AF") 930, User Plane Function ("UPF")/PGW-User plane function ("PGW-U") 935, Home Subscriber Server ("HSS")/Unified Data Management ("UDM") 940, and Authentication Server Function ("AUSF") 945. Environment 900 may also include one or more networks, such as Data Network ("DN") 950. Environment 900 may include one or more additional devices or systems communicatively coupled to one or more networks (e.g., DN 950), such as REES 101.

The example shown in FIG. 9 illustrates one instance of each network component or function (e.g., one instance of SMF/PGW-C 920, PCF/PCRF 925, UPF/PGW-U 935, HSS/UDM 940, and/or AUSF 945). In practice, environment 900 may include multiple instances of such components or functions. For example, in some embodiments, environment 900 may include multiple "slices" of a core network, where each slice includes a discrete set of network functions (e.g., one slice may include a first instance of SMF/PGW-C 920, PCF/PCRF 925, UPF/PGW-U 935, HSS/UDM 940, and/or AUSF 945, while another slice may include a second instance of SMF/PGW-C 920, PCF/PCRF 925, UPF/PGW-U 935, HSS/UDM 940, and/or AUSF 945). The different slices may provide differentiated levels of service, such as service in accordance with different Quality of Service ("QoS") parameters.

The quantity of devices and/or networks, illustrated in FIG. 9, is provided for explanatory purposes only. In practice, environment 900 may include additional devices and/or networks, fewer devices and/or networks, different devices and/or networks, or differently arranged devices and/or networks than illustrated in FIG. 9. For example, while not shown, environment 900 may include devices that facilitate or enable communication between various components shown in environment 900, such as routers, modems, gateways, switches, hubs, etc. Alternatively, or additionally, one or more of the devices of environment 900 may perform one or more network functions described as being performed by another one or more of the devices of environment 900. Devices of environment 900 may interconnect with each other and/or other devices via wired connections, wireless connections, or a combination of wired and wireless connections. In some implementations, one or more devices of environment 900 may be physically integrated in, and/or may be physically attached to, one or more other devices of environment 900.

UE 109 may include a computation and communication device, such as a wireless mobile communication device that is capable of communicating with RAN 910, RAN 912, and/or DN 950. UE 109 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Machine-to-Machine ("M2M") device, or another type of mobile computation and communication device. UE 109 may send traffic to and/or receive traffic (e.g., user plane traffic) from DN 950 via RAN 910, RAN 912, and/or UPF/PGW-U 935.

RAN 910 may be, or may include, a 5G RAN that includes one or more base stations (e.g., one or more gNBs 911), via which UE 109 may communicate with one or more other elements of environment 900. UE 109 may communicate with RAN 910 via an air interface (e.g., as provided by gNB 911). For instance, RAN 910 may receive traffic (e.g., voice call traffic, data traffic, messaging traffic, signaling traffic, etc.) from UE 109 via the air interface, and may communicate the traffic to UPF/PGW-U 935, and/or one or more other devices or networks. Similarly, RAN 910 may receive traffic intended for UE 109 (e.g., from UPF/PGW-U 935, AMF 915, and/or one or more other devices or networks) and may communicate the traffic to UE 109 via the air interface. In some embodiments, base station 401 may be, may include, and/or may be implemented by one or more gNBs 911.

RAN 912 may be, or may include, a LTE RAN that includes one or more base stations (e.g., one or more eNBs 913), via which UE 109 may communicate with one or more other elements of environment 900. UE 109 may communicate with RAN 912 via an air interface (e.g., as provided by eNB 913). For instance, RAN 910 may receive traffic (e.g., voice call traffic, data traffic, messaging traffic, signaling traffic, etc.) from UE 109 via the air interface, and may communicate the traffic to UPF/PGW-U 935, and/or one or more other devices or networks. Similarly, RAN 910 may receive traffic intended for UE 109 (e.g., from UPF/PGW-U 935, SGW 917, and/or one or more other devices or networks) and may communicate the traffic to UE 109 via the air interface. In some embodiments, base station 401 may be, may include, and/or may be implemented by one or more eNBs 913.

AMF 915 may include one or more devices, systems, Virtualized Network Functions ("VNFs"), etc., that perform operations to register UE 109 with the 5G network, to establish bearer channels associated with a session with UE 109, to hand off UE 109 from the 5G network to another network, to hand off UE 109 from the other network to the 5G network, manage mobility of UE 109 between RANs 910 and/or gNBs 911, and/or to perform other operations. In some embodiments, the 5G network may include multiple AMFs 915, which communicate with each other via the N14 interface (denoted in FIG. 9 by the line marked "N14" originating and terminating at AMF 915).

MME 916 may include one or more devices, systems, VNFs, etc., that perform operations to register UE 109 with the EPC, to establish bearer channels associated with a session with UE 109, to hand off UE 109 from the EPC to another network, to hand off UE 109 from another network to the EPC, manage mobility of UE 109 between RANs 912 and/or eNBs 913, and/or to perform other operations.

SGW 917 may include one or more devices, systems, VNFs, etc., that aggregate traffic received from one or more eNBs 913 and send the aggregated traffic to an external network or device via UPF/PGW-U 935. Additionally, SGW 917 may aggregate traffic received from one or more UPF/PGW-Us 935 and may send the aggregated traffic to one or more eNBs 913. SGW 917 may operate as an anchor for the user plane during inter-eNB handovers and as an anchor for mobility between different telecommunication networks or RANs (e.g., RANs 910 and 912).

SMF/PGW-C 920 may include one or more devices, systems, VNFs, etc., that gather, process, store, and/or provide information in a manner described herein. SMF/PGW-C 920 may, for example, facilitate the establishment of communication sessions on behalf of UE 109. In some embodiments, the establishment of communications sessions may be performed in accordance with one or more policies provided by PCF/PCRF 925. In some embodiments, SW' 701 may be, may include, and/or may be implemented by SMF/PGW-C 920.

PCF/PCRF 925 may include one or more devices, systems, VNFs, etc., that aggregate information to and from the 5G network and/or other sources. PCF/PCRF 925 may receive information regarding policies and/or subscriptions from one or more sources, such as subscriber databases and/or from one or more users (such as, for example, an administrator associated with PCF/PCRF 925).

AF 930 may include one or more devices, systems, VNFs, etc., that receive, store, and/or provide information that may be used in determining parameters (e.g., quality of service parameters, charging parameters, or the like) for certain applications.

UPF/PGW-U 935 may include one or more devices, systems, VNFs, etc., that receive, store, and/or provide data (e.g., user plane data). For example, UPF/PGW-U 935 may receive user plane data (e.g., voice call traffic, data traffic, etc.), destined for UE 109, from DN 950, and may forward the user plane data toward UE 109 (e.g., via RAN 910, SMF/PGW-C 920, and/or one or more other devices). In some embodiments, multiple UPFs 935 may be deployed (e.g., in different geographical locations), and the delivery of content to UE 109 may be coordinated via the N9 interface (e.g., as denoted in FIG. 9 by the line marked "N9" originating and terminating at UPF/PGW-U 935). Similarly, UPF/PGW-U 935 may receive traffic from UE 109 (e.g., via RAN 910, SMF/PGW-C 920, and/or one or more other devices), and may forward the traffic toward DN 950. In some embodiments, UPF/PGW-U 935 may communicate (e.g., via the N4 interface) with SMF/PGW-C 920, regarding user plane data processed by UPF/PGW-U 935.

HSS/UDM 940 and AUSF 945 may include one or more devices, systems, VNFs, etc., that manage, update, and/or store, in one or more memory devices associated with AUSF 945 and/or HSS/UDM 940, profile information associated with a subscriber. AUSF 945 and/or HSS/UDM 940 may perform authentication, authorization, and/or accounting operations associated with the subscriber and/or a communication session with UE 109.

DN 950 may include one or more wired and/or wireless networks. For example, DN 950 may include an Internet Protocol ("IP")-based PDN, a wide area network ("WAN") such as the Internet, a private enterprise network, and/or one or more other networks. UE 109 may communicate, through DN 950, with data servers, other UEs 109, and/or to other servers or applications that are coupled to DN 950. DN 950 may be connected to one or more other networks, such as a public switched telephone network ("PSTN"), a public land mobile network ("PLMN"), and/or another network. DN 950 may be connected to one or more devices, such as content providers, applications, web servers, and/or other devices, with which UE 109 may communicate.

REES 101 may include one or more devices, systems, VNFs, etc. that receive traffic throughput metrics and energy consumption metrics associated with one or more elements of environment 900, and compute granular (e.g., per-network slice, per-network element, per-protocol, per-layer, etc.) measures of energy efficiency associated with the one or more one or more elements. REES 101 may determine network parameter modifications based on the granular measures of energy efficiency, and/or provide such measures of energy efficiency to the one or more network elements, which may grant access to UEs 109 based on the granular measures of energy efficiency (e.g., may select one or more cells, DUs 105, base stations 401, network slices, etc. for one or more UEs 109). REES 101 and/or the one or more network elements may make network parameter modifications based on the granular measures of energy efficiency, such as activating "sleep" or "suspend" modes, and/or otherwise performing energy saving techniques.

Figure 10:
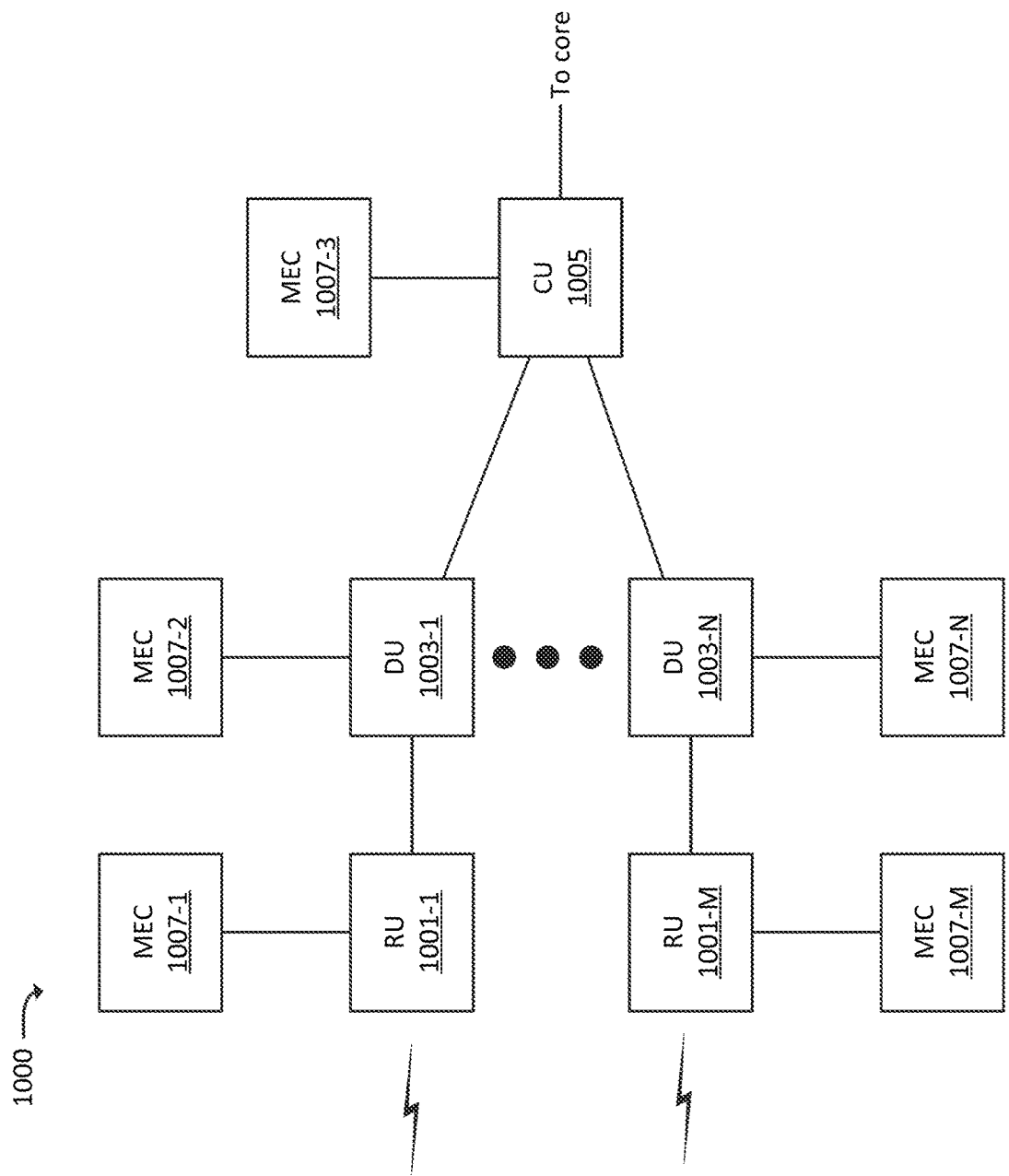
FIG. 10 illustrates an example arrangement of a radio access network ("RAN"), in accordance with some embodiments.

FIG. 10 illustrates an example Distributed Unit ("DU") network 1000, which may be included in and/or implemented by one or more RANs (e.g., RAN 910, RAN 912, or some other RAN). In some embodiments, a particular RAN may include one DU network 1000. In some embodiments, a particular RAN may include multiple DU networks 1000. In some embodiments, DU network 1000 may correspond to a particular gNB 911 of a 5G RAN (e.g., RAN 910). In some embodiments, DU network 1000 may correspond to multiple gNBs 911. In some embodiments, DU network 1000 may correspond to one or more other types of base stations of one or more other types of RANs. As shown, DU network 1000 may include Central Unit ("CU") 1005, one or more Distributed Units ("DUs") 1003-1 through 1003-N (referred to individually as "DU 1003," or collectively as "DUs 1003"), and one or more Radio Units ("RUs") 1001-1 through 1001-M (referred to individually as "RU 1001," or collectively as "RUs 1001").

CU 1005 may communicate with a core of a wireless network (e.g., may communicate with one or more of the devices or systems described above with respect to FIG. 9, such as AMF 915 and/or UPF/PGW-U 935). In the uplink direction (e.g., for traffic from UEs 109 to a core network), CU 1005 may aggregate traffic from DUs 1003, and forward the aggregated traffic to the core network. In some embodiments, CU 1005 may receive traffic according to a given protocol (e.g., Radio Link Control ("RLC")) from DUs 1003, and may perform higher-layer processing (e.g., may aggregate/process RLC packets and generate Packet Data Convergence Protocol ("PDCP") packets based on the RLC packets) on the traffic received from DUs 1003.

In accordance with some embodiments, CU 1005 may receive downlink traffic (e.g., traffic from the core network) for a particular UE 109, and may determine which DU(s) 1003 should receive the downlink traffic. DU 1003 may include one or more devices that transmit traffic between a core network (e.g., via CU 1005) and UE 109 (e.g., via a respective RU 1001). DU 1003 may, for example, receive traffic from RU 1001 at a first layer (e.g., physical ("PHY") layer traffic, or lower PHY layer traffic), and may process/aggregate the traffic to a second layer (e.g., upper PHY and/or RLC). DU 1003 may receive traffic from CU 1005 at the second layer, may process the traffic to the first layer, and provide the processed traffic to a respective RU 1001 for transmission to UE 109.

RU 1001 may include hardware circuitry (e.g., one or more RF transceivers, antennas, radios, and/or other suitable hardware) to communicate wirelessly (e.g., via an RF interface) with one or more UEs 109, one or more other DUs 1003 (e.g., via RUs 1001 associated with DUs 1003), and/or any other suitable type of device. In the uplink direction, RU 1001 may receive traffic from UE 109 and/or another DU 1003 via the RF interface and may provide the traffic to DU 1003. In the downlink direction, RU 1001 may receive traffic from DU 1003, and may provide the traffic to UE 109 and/or another DU 1003.

RUs 1001 may, in some embodiments, be communicatively coupled to one or more Multi-Access/Mobile Edge Computing ("MEC") devices, referred to sometimes herein simply as "MECs" 1007. For example, RU 1001-1 may be communicatively coupled to MEC 1007-1, RU 1001-M may be communicatively coupled to MEC 1007-M, DU 1003-1 may be communicatively coupled to MEC 1007-2, DU 1003-N may be communicatively coupled to MEC 1007-N, CU 1005 may be communicatively coupled to MEC 1007-3, and so on. MECs 1007 may include hardware resources (e.g., configurable or provisionable hardware resources) that may be configured to provide services and/or otherwise process traffic to and/or from UE 109, via a respective RU 1001.

For example, RU 1001-1 may route some traffic, from UE 109, to MEC 1007-1 instead of to a core network (e.g., via DU 1003 and CU 1005). MEC 1007-1 may process the traffic, perform one or more computations based on the received traffic, and may provide traffic to UE 109 via RU 1001-1. In this manner, ultra-low latency services may be provided to UE 109, as traffic does not need to traverse DU 1003, CU 1005, and an intervening backhaul network between DU network 1000 and the core network. In some embodiments, MEC 1007 may include, and/or may implement, some or all of the functionality described above with respect to REES 101.

Figure 11:
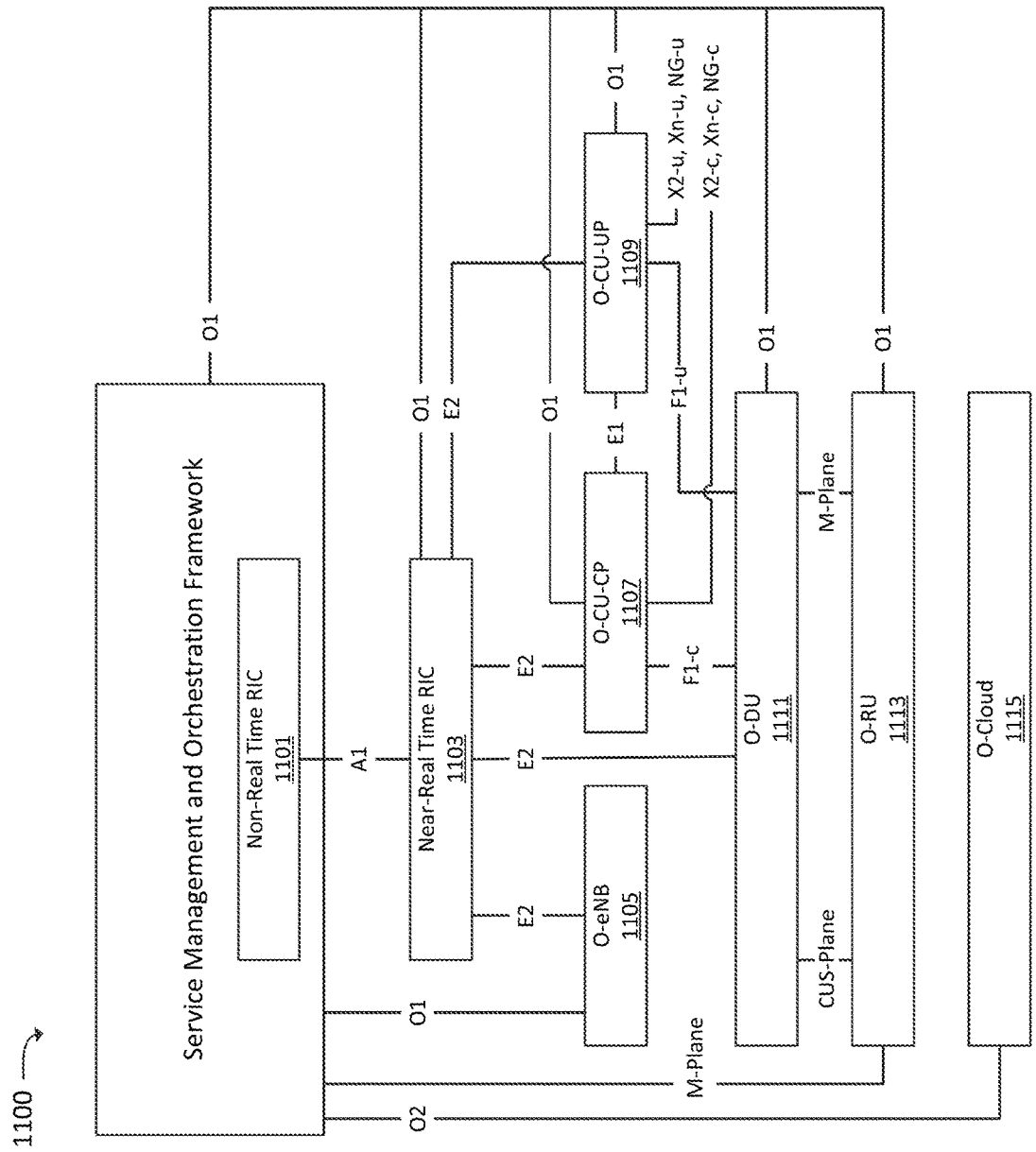
FIG. 11 illustrates an example arrangement of an Open RAN ("O-RAN") environment in which one or more embodiments, described herein, may be implemented.

FIG. 11 illustrates an example O-RAN environment 1100, which may correspond to RAN 910, RAN 912, and/or DU network 1000. For example, RAN 910, RAN 912, and/or DU network 1000 may include one or more instances of O-RAN environment 1100, and/or one or more instances of O-RAN environment 1100 may implement RAN 910, RAN 912, DU network 1000, and/or some portion thereof. As shown, O-RAN environment 1100 may include Non-Real Time Radio Intelligent Controller ("RIC") 1101, Near-Real Time RIC 1103, O-eNB 1105, O-CU-Control Plane ("O-CU-CP") 1107, O-CU-User Plane ("O-CU-UP") 1109, O-DU 1111, O-RU 1113, and O-Cloud 1115. In some embodiments, O-RAN environment 1100 may include additional, fewer, different, and/or differently arranged components.

In some embodiments, some or all of the elements of O-RAN environment 1100 may be implemented by one or more configurable or provisionable resources, such as virtual machines, cloud computing systems, physical servers, and/or other types of configurable or provisionable resources. In some embodiments, some or all of O-RAN environment 1100 may be implemented by, and/or communicatively coupled to, one or more MECs 1007.

Non-Real Time RIC 1101 and Near-Real Time RIC 1103 may receive performance information and/or other types of information, such as granular energy efficiency metrics and/or scores, from one or more sources (e.g., REES 101 and/or one or more other sources), and may configure other elements of O-RAN environment 1100 based on such performance information, granular energy efficiency information, or other information. For example, Near-Real Time RIC 1103 may receive performance information, via one or more E2 interfaces and/or other suitable interfaces, from REES 101, O-eNB 1105, O-CU-CP 1107, O-CU-UP 1109, and/or one or more other sources, and may modify parameters associated with O-eNB 1105, O-CU-CP 1107, and/or O-CU-UP 1109 based on such information. Similarly, Non-Real Time MC 1101 may receive performance and/or granular energy information information associated with O-eNB 1105, O-CU-CP 1107, O-CU-UP 1109, and/or one or more other elements of O-RAN environment 1100 and may utilize machine learning and/or other higher level computing or processing to determine modifications to the configuration of O-eNB 1105, O-CU-CP 1107, O-CU-UP 1109, and/or other elements of O-RAN environment 1100. In some embodiments, Non-Real Time RIC 1101 may generate machine learning models based on performance information associated with O-RAN environment 1100 or other sources, and may provide such models to Near-Real Time RIC 1103 for implementation.

O-eNB 1105 may perform functions similar to those described above with respect to eNB 913. For example, O-eNB 1105 may facilitate wireless communications between UE 109 and a core network. O-CU-CP 1107 may perform control plane signaling to coordinate the aggregation and/or distribution of traffic via one or more DUs 1003, which may include and/or be implemented by one or more O-DUs 1111, and O-CU-UP 1109 may perform the aggregation and/or distribution of traffic via such DUs 1003 (e.g., O-DUs 1111). O-DU 1111 may be communicatively coupled to one or more RUs 1001, which may include and/or may be implemented by one or more O-RUs 1113. In some embodiments, O-Cloud 1115 may include or be implemented by one or more MECs 1007, which may provide services, and may be communicatively coupled, to O-CU-CP 1107, O-CU-UP 1109, O-DU 1111, and/or O-RU 1113 (e.g., via an O1 and/or O2 interface).

Figure 12:
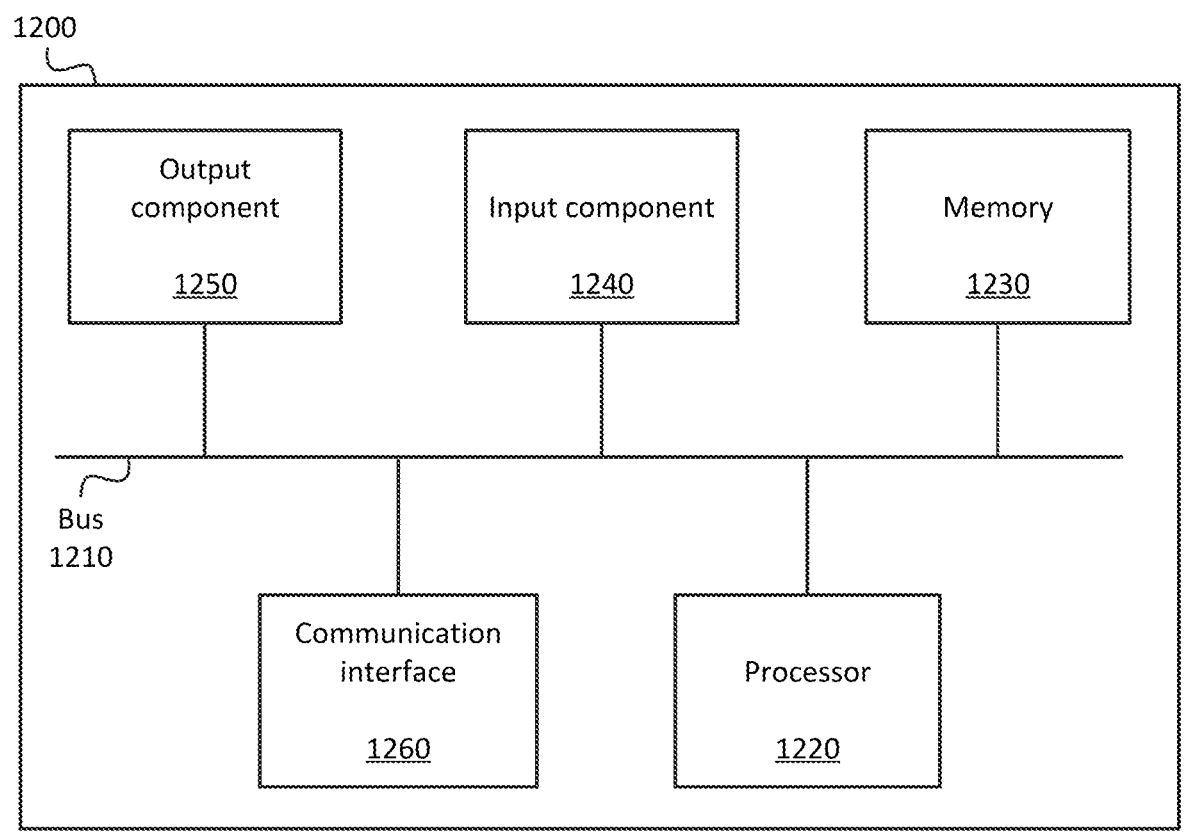
FIG. 12 illustrates example components of one or more devices, in accordance with one or more embodiments described herein.

FIG. 12 illustrates example components of device 1200. One or more of the devices described above may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200 and/or other receives or detects input from a source external to 1240, such as a touchpad, a touchscreen, a keyboard, a keypad, a button, a switch, a microphone or other audio input component, etc. In some embodiments, input component 1240 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-8), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
receive traffic throughput metrics associated with a set of network elements of a wireless network, wherein the traffic throughput metrics indicate an amount of traffic processed by the set of network elements over a particular period of time, wherein the traffic throughput metrics include:
a first measure of traffic throughput associated with a first network slice over the particular time period, and
a second measure of traffic throughput associated with a second network slice over the particular time period;
receive energy consumption metrics associated with the set of network elements, wherein the energy consumption metrics indicate an amount of energy consumed by the set of network elements over the particular period of time;
compute a measure of energy efficiency associated with each network element, of the set of network elements, based on the received traffic throughput metric and energy consumption metrics associated with the each network element, wherein computing the measure of energy efficiency includes:
computing a first measure of energy efficiency, associated with the first network slice, based on the first measure of traffic throughput, and
computing a second measure of energy efficiency, associated with the second network slice, based on the second measure of traffic throughput;
receive a request to access the wireless network; and
select, based on the computed measure of energy efficiency associated with each network element of the set of network elements, a particular network element, from the set of network elements, to provide the requested access to the wireless network.

2. The device of claim 1, wherein the set of network elements includes a plurality of base stations of a radio access network ("RAN") associated with the wireless network, wherein the request is received from a User Equipment ("UE"), wherein selecting the particular network element includes selecting a particular base station of the plurality of base stations to which the UE should connect, and wherein the particular base station provides the requested access by establishing a connection with the UE.

3. The device of claim 1, wherein the set of network elements includes a plurality of Distributed Units ("DUs") associated with the wireless network, wherein the request is received from a User Equipment ("UE"), wherein selecting the particular network element includes selecting a particular DU of the plurality of DUs to which the UE should connect, and wherein the particular DU provides the requested access by establishing a connection with the UE.

4. The device of claim 3, wherein the selecting is performed by a Central Unit ("CU") that is communicatively coupled to the plurality of DUs.

5. The device of claim 1,
wherein the set of network elements includes:
a first plurality of network elements associated with a first network slice, and
a second plurality of network elements associated with a second network slice,
wherein selecting the particular network element includes outputting an indication that the first network slice has been selected, in lieu of the second network slice, to provide the requested access.

6. The device of claim 1, wherein the set of network elements implement a plurality of different protocols, wherein the traffic throughput metrics associated with the set of network elements include at least:
a first quantity of protocol units, associated with a first protocol, processed by each network element of the set of network elements over the particular time period, and
a second quantity of protocol units, associated with a second protocol, processed by each network element of the set of network elements over the particular time period.

7. A non-transitory computer-readable medium, storing a plurality of processor-executable instructions to:
receive traffic throughput metrics associated with a set of network elements of a wireless network, wherein the traffic throughput metrics indicate an amount of traffic processed by the set of network elements over a particular period of time, wherein the traffic throughput metrics include:
a first measure of traffic throughput associated with a first network slice over the particular time period, and
a second measure of traffic throughput associated with a second network slice over the particular time period;
receive energy consumption metrics associated with the set of network elements, wherein the energy consumption metrics indicate an amount of energy consumed by the set of network elements over the particular period of time;
compute a measure of energy efficiency associated with each network element, of the set of network elements, based on the received traffic throughput metric and energy consumption metrics associated with the each network element, wherein computing the measure of energy efficiency includes:
computing a first measure of energy efficiency, associated with the first network slice, based on the first measure of traffic throughput, and
computing a second measure of energy efficiency, associated with the second network slice, based on the second measure of traffic throughput;
receive a request to access the wireless network; and
select, based on the computed measure of energy efficiency associated with each network element of the set of network elements, a particular network element, from the set of network elements, to provide the requested access to the wireless network.

8. The non-transitory computer-readable medium of claim 7, wherein the set of network elements includes a plurality of base stations of a radio access network ("RAN") associated with the wireless network, wherein the request is received from a User Equipment ("UE"), wherein selecting the particular network element includes selecting a particular base station of the plurality of base stations to which the UE should connect, and wherein the particular base station provides the requested access by establishing a connection with the UE.

9. The non-transitory computer-readable medium of claim 7, wherein the set of network elements includes a plurality of Distributed Units ("DUs") associated with the wireless network, wherein the request is received from a User Equipment ("UE"), wherein selecting the particular network element includes selecting a particular DU of the plurality of DUs to which the UE should connect, and wherein the particular DU provides the requested access by establishing a connection with the UE.

10. The non-transitory computer-readable medium of claim 9, wherein the selecting is performed by a Central Unit ("CU") that is communicatively coupled to the plurality of DUs.

11. The non-transitory computer-readable medium of claim 7,
wherein the set of network elements includes:
a first plurality of network elements associated with a first network slice, and
a second plurality of network elements associated with a second network slice,
wherein selecting the particular network element includes outputting an indication that the first network slice has been selected, in lieu of the second network slice, to provide the requested access.

12. The non-transitory computer-readable medium of claim 7, wherein the set of network elements implement a plurality of different protocols, wherein the traffic throughput metrics associated with the set of network elements include at least:
a first quantity of protocol units, associated with a first protocol, processed by each network element of the set of network elements over the particular time period, and
a second quantity of protocol units, associated with a second protocol, processed by each network element of the set of network elements over the particular time period.

13. A method, comprising:
receiving traffic throughput metrics associated with a set of network elements of a wireless network, wherein the traffic throughput metrics indicate an amount of traffic processed by the set of network elements over a particular period of time, wherein the traffic throughput metrics include:
a first measure of traffic throughput associated with a first network slice over the particular time period, and
a second measure of traffic throughput associated with a second network slice over the particular time period;
receiving energy consumption metrics associated with the set of network elements, wherein the energy consumption metrics indicate an amount of energy consumed by the set of network elements over the particular period of time;
computing a measure of energy efficiency associated with each network element, of the set of network elements, based on the received traffic throughput metric and energy consumption metrics associated with the each network element, wherein computing the measure of energy efficiency includes:
computing a first measure of energy efficiency, associated with the first network slice, based on the first measure of traffic throughput, and computing a second measure of energy efficiency, associated with the second network slice, based on the second measure of traffic throughput;

receiving a request to access the wireless network; and selecting, based on the computed measure of energy efficiency associated with each network element of the set of network elements, a particular network element, from the set of network elements, to provide the requested access to the wireless network.

14. The method of claim 13, wherein the set of network elements includes a plurality of base stations of a radio access network ("RAN") associated with the wireless network, wherein the request is received from a User Equipment ("UE"), wherein selecting the particular network element includes selecting a particular base station of the plurality of base stations to which the UE should connect, and wherein the particular base station provides the requested access by establishing a connection with the UE.

15. The method of claim 13, wherein the set of network elements includes a plurality of Distributed Units ("DUs") associated with the wireless network, wherein the request is received from a User Equipment ("UE"), wherein selecting the particular network element includes selecting a particular DU of the plurality of DUs to which the UE should connect, and wherein the particular DU provides the requested access by establishing a connection with the UE, wherein the selecting is performed by a Central Unit ("CU") that is communicatively coupled to the plurality of DUs.

16. The method of claim 13,
wherein the set of network elements includes:
a first plurality of network elements associated with a first network slice, and
a second plurality of network elements associated with a second network slice,
wherein selecting the particular network element includes outputting an indication that the first network slice has been selected, in lieu of the second network slice, to provide the requested access.

17. The method of claim 13, wherein the set of network elements implement a plurality of different protocols, wherein the traffic throughput metrics associated with the set of network elements include at least:
a first quantity of protocol units, associated with a first protocol, processed by each network element of the set of network elements over the particular time period, and
a second quantity of protocol units, associated with a second protocol, processed by each network element of the set of network elements over the particular time period.

18. The method of claim 17, wherein the first protocol or the second protocol is associated with at least one of:
a Service Data Application Protocol ("SDAP") layer,
a Packet Data Convergence Protocol ("PDCP") layer,
a Radio Link Control ("RLC") layer, or
a Media Access Control ("MAC") layer.

19. The device of claim 6, wherein the first protocol or the second protocol is associated with at least one of:
a Service Data Application Protocol ("SDAP") layer,
a Packet Data Convergence Protocol ("PDCP") layer,
a Radio Link Control ("RLC") layer, or
a Media Access Control ("MAC") layer.

20. The non-transitory computer-readable medium of claim 12, wherein the first protocol or the second protocol is associated with at least one of:
a Service Data Application Protocol ("SDAP") layer,
a Packet Data Convergence Protocol ("PDCP") layer,
a Radio Link Control ("RLC") layer, or
a Media Access Control ("MAC") layer.

* * * * *